Dec. 11, 1956     J. B. WHEATLEY     2,773,667
TURBINE ROTOR SEALING RING
Filed Feb. 8, 1950
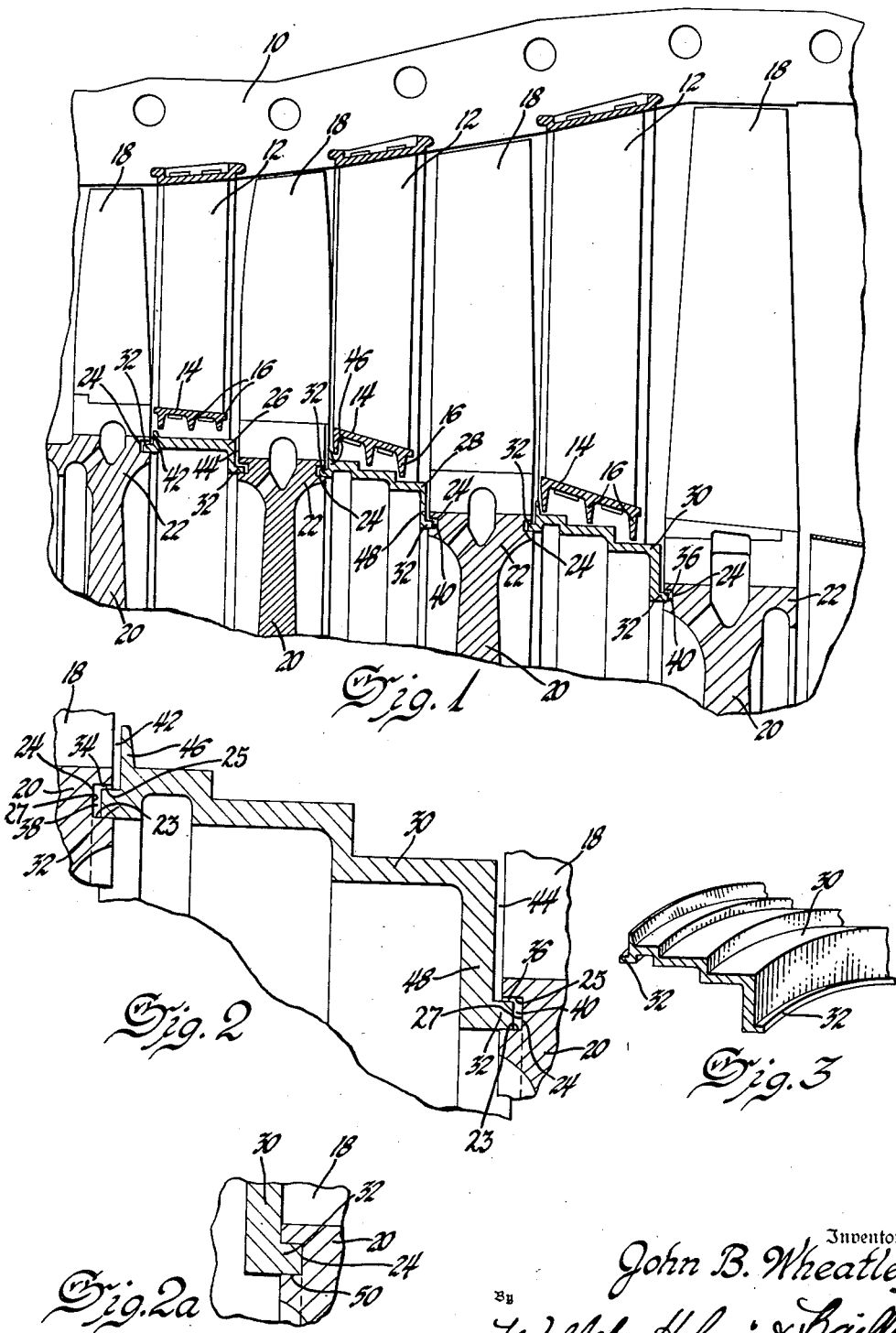
Inventor
John B. Wheatley
By Willito, Helmig & Baillio
Attorneys

United States Patent Office 2,773,667
Patented Dec. 11, 1956

2,773,667

TURBINE ROTOR SEALING RING

John B. Wheatley, Indianapolis, Ind., assignor to General Motors Corporation, Detroit, Mich., a corporation of Delaware Application February 8, 1950, Serial No. 143,023

2 Claims. (Cl. 253—39)

This invention relates to turbines or compressors and particularly to an improved rotor sealing ring structure for reducing leakage of fluid around the blade tips of an axial flow elastic fluid turbine or compressor and for preventing fracture of the sealing ring.

The principal object of this invention is to provide a rotor sealing ring so secured between the rims of adjacent rotor wheels as to cooperate with sealing means affixed to tips of stator blades and to permit thermal expansion of the ring in both radial and axial directions without creating destructive vibrations or increasing fluid leakage due to distortion or fracture of these rings under operating conditions.

In most cases the sealing member or ring will expand more quickly and to a greater extent than the rotor wheels during operation of the turbine because the ring is almost invariably of a lighter construction than the wheels and is more fully exposed to the hot elastic fluid. The fatigue induced in such sealing rings after the repeated expansion and contraction, due to the frequent commencement and cessation of turbine operation, particularly if the ring is heavily stressed, results in a lowering of the elastic limit of the ring metal. As a consequence, when there is inadequate provision for differences in expansion between the rotor wheels and the sealing ring, this lowered elastic limit is often exceeded after comparatively few heating and cooling cycles, resulting in fracture of the ring.

In the past such turbine sealing rings have been customarily secured in one of three ways. Often only one edge of the ring has been affixed to an adjacent turbine wheel by bolting, welding, riveting, etc., with the other end free and easily distortable. In these cases there is a tendency to cause excessive leakage of elastic fluid between the wheels of the sealing member because of ring warpage due to the differential in thermal expansion between the wheels and the sealing member in either the radial or the axial direction or both.

In other instances, both ring edges have been rigidly attached to turbine wheels with no provision for expansion of the ring relative to the wheels. A third method has been to use only a shrink fit to secure the ring upon horizontal portions of adjacent rotor wheels, no other means being provided for ring attachment, the wheels limiting relative radial movement of the ring to one direction only.

Where both edges are rigidly secured or where the ring has a snug fit on the inside of horizontal portions of adjacent rotor wheels, where is a great danger of ring fracture by stressing it beyond the failure point. When the third method is used and the sealing rings are positioned between rotor wheels so loosely as to prevent rupture of the rings upon expansion, a loose ring fit and excessive vibration of the ring often result when the ring, during operation, becomes fully heated and radially expanded to the fullest extent. This is particularly true in those cases where the ring is positioned outside the horizontal supporting surface of the wheel.

Because of these conditions it is exceedingly difficult to form a rotor sealing ring, acting in conjunction with the rotor wheels and sealing means on the tips of stator blades, which adequately prevents fluid leakage around the tips of the stator blades and at the same time is not stressed beyond its elastic limit due to the combination of thermal expansion of the ring and the structural restriction caused by the rotor wheels.

The present invention circumvents these difficulties by having a one-piece sealing ring so positioned in annular grooves in the flanks of the rotor wheels as to permit both radial and axial expansion of the ring within the grooves without unduly stressing the ring. This is accomplished in accordance with the invention preferably by providing the ring with a pressed fit upon the inner, substantially horizontal walls of the groove while providing clearances between the edges of the ring and the other wheel surfaces.

Furthermore, the sealing ring is simple and inexpensive to manufacture and assemble, light in weight, and possesses adequate structural strength. These features are particularly desirable in aircraft turbine construction, where weight is such a major consideration.

Other objects and advantages of the invention will more fully appear from the following description of the preferred embodiment of the invention illustrated in the accompanying drawing, in which:

Figure 1 is a fragmentary longitudinal section of an axial flow elastic fluid turbine provided with rotor wheels and rotor sealing rings embodying the invention;

Figure 2 is an enlarged fragmentary sectional view of one of the sealing rings shown in Figure 1, showing the seating of the ring edges within the wheel grooves before commencement of operation of the turbine;

Figure 2a is an enlarged fragmentary section of a rotor sealing ring edge and a flank of a wheel rim, showing the seating of the ring within a wheel groove during operation of the turbine; and Figure 3 is a perspective view of a portion of the sealing ring shown in Figure 2.

Referring to the drawing, in Figure 1, 10 represents the casing of an axial flow elastic fluid turbine embodying the invention. Secured to the inner surface of the casing are stator blades 12 to which are affixed annular sealing members 14 having inwardly projecting flanges 16. Axially disposed between the stator blades 12 are rotor blades 18 attached to rotor wheels 20, which in turn are secured to the turbine shaft which is not shown. During operation of the turbine the elastic fluid is directed by the nozzles formed by one row of stator blades to the passages defined between the adjacent rotor blades and discharged from the latter to the nozzles formed by the next annular series of stator blades. The flanks or faces (the side faces) of the enlarged rims 22 of the rotor wheels 20, which constitute part of the faces of the wheels, contain annular grooves 24. Between these wheel rims are positioned the rotor sealing rings 26, 28 and 30, constructed preferably of rolled stock, which have generally axial extensions 32 extending from the central portion or body thereof into the annular grooves 24 of both adjacent wheel rims. These sealing rings are so constructed and arranged between the wheels and in relation to the stator blades as to provide substantially cylindrical radially exterior sealing surfaces on the bodies of the rings which cooperate with the flanges 16 of the stator sealing members 14 to prevent fluid leakage.

The dimensional relationship of the sealing ring extensions 32 and the wheel grooves 24 and the position of these extensions within the grooves before commencing operation of the turbine are best shown in detail in Figure 2; this position will be hereinafter referred to as the "cold" position. In the embodiment shown, wherein the ring is assembled with a pressed fit upon the shoulder defined by the radially inner wall 23 of the wheel rim groove 24, the sealing ring extensions are sufficiently smaller than the rim grooves to provide annular radial clearances 34 and 36 between the radially outer surface of the ring extensions 32 and the radially outer wall 25 of the grooves 24 to allow for radial expansion of the sealing ring relative to the wheels. The rotor sealing ring 30, being of relatively small mass, expands more quickly than the wheels 20 and is not restrained by the radially outer wall of the groove 24 until the expansion has taken up the small radial clearances 34 and 36. Free expansion of the ring and wheels in the axial direction is similarly permitted by the provision of the annular axial clearance 38 and 40 between the axially outer edges of the extensions 32 and the bases 27 of the wheel rim grooves and the axial clearances 42 and 44 of approximately the same size between the wheel rims, including the edges of the rotor blades 18, and the vertical legs 46 and 48 of the sealing ring. The extensions 32 and the faces of legs 46 and 48 facing the wheels constitute the edges of the ring.

It will be noted that the clearances providing the axial expansion are substantially larger than those providing the radial expansion, inasmuch as most of the differential expansion between the wheels and the ring will be in an axial rather than a radial direction. In the embodiment shown in Figure 2 the axial clearances 38, 40, 42 and 44 between the edges of the rings and the wheels are approximately three times as large as radial clearances 34 and 36. This construction is necessary because the rotor wheels, as well as the sealing ring, expand in both axial and radial directions. Therefore, inasmuch as the radial expansion of the turbine wheels is in the same direction as the expansion of the ring, the radial expansion of the wheel would tend to counterbalance the radial expansion of the ring, thereby substantially reducing the required sizes of the clearances 34 and 36. Only the difference in degree of exposure of the wheels and the ring to the hot fluids and any variation between the respective coefficients of expansion of the wheels and the ring create the necessity for such radial clearances at all. On the other hand, the rotor wheels and the sealing ring expand in opposite axial directions, resulting in an additive effect regarding the closure of the annular clearances 38, 40, 42 and 44 provided for axial expansion and necessitating their comparatively large sizes.

The arrangement shown in Figure 2 permits rapid expansion of the ring and its retention in the grooves without stressing the ring metal beyond the failure point. Moreover, the clearances further prevent undue warping of the ring, either inwardly, causing inordinate fluid leakage around the stator blade tips, or outwardly, resulting in excessive contact and wear between the flanges 16 of the stator blade sealing members and the ring.

For purposes of description the sizes of all clearances have been greatly exaggerated in the drawing. Actually, only relatively small clearances are necessary if these are properly dimensioned. In the embodiment shown in the drawing, under non-operating conditions if the average diameter of the supporting wheels is approximately one foot and the wheel rim and sealing ring each has approximately a one-inch width, the sum of the two clearances 38, 42 at one edge and 40, 44 at the other edge providing for axial expansion need be only a few thousandths of an inch, for example, in the range from 0.002 to 0.022 inch; and each of the clearances 34 and 36 providing for radial expansion need average only approximately one-sixth of the total axial clearance, for example, from 0.001 to 0.003 inch. Therefore, the sum of the two axial clearances 38, 42 and 40, 44 should range from about 0.1 percent to 1.1 percent of the combined widths of the ring and a wheel rim, measured between groove bases. Likewise, radial clearances 34 and 36 are each from about 0.02 percent to 0.06 percent of the average radius of the annular grooves 24. These suggested dimensions are based upon the use of materials, such as ferrous metals, having coefficients of expansion in the range between $9 \times 10^{-6}$ and $11 \times 10^{-6}$. Of course, the size of the clearances will be governed to a great extent in each case by the relative degree of exposure of the wheels and the sealing ring to the hot elastic fluids and the temperatures to which these members are to be subjected.

Inasmuch as the sealing ring is somewhat free to slide axially upon the inner walls of the grooves 24, within the limits imposed by the groove bases, it will be understood, of course, that the sum of the clearances 38, 42 and 40, 44 providing for axial expansion is the critical factor and that the invention is not limited by the size of one of these clearances relative to the other.

Figure 2a indicates the seating of the sealing ring 30 within the annular wheel groove 24 when the ring and rotor wheels have reached operating temperature. It will be noted that this "hot" position is one wherein the expansion of the sealing ring 30 and the wheels 20 between which the ring is positioned has effected a complete closure of the groove. Where, however, the coefficients of expansion of the metals used in the wheels and the sealing ring are substantially the same and where, under running conditions, both the ring extension 32 and the portion of the rotor wheel contiguous to the groove 24 are heated to aproximately the same temperature, there may exist a very small annular clearance at 50 between the radially inner surface of the ring extension 32 and the radially inner wall 23 of the groove. The sealing ring in this latter "hot" position is still securely retained in the wheel groove by contact between the radially outer surface of the ring extension and the radially outer wall of the wheel rim groove and between the contiguous radial surfaces of the two members, thereby preventing vibration of the ring within the groove. Normally, however, the temperature difference between the flanks of the wheel rim 22 and the sealing ring, resulting from the greater exposure of the latter to the hot fluids, will create a sufficient differential of expansion between these members to cause the ring extension 32 to completely occupy the groove.

Figure 1, it will be observed, illustrates two slightly different rotor sealing ring designs. Ring 26 is of a substantially cylindrical type while rings 28 and 30 are of a stepped construction providing a series of generally cylindrical surfaces which cooperate with the annular sealing members 14 to form a labyrinth seal. Although this latter seal structure effectively prevents fluid leakage, the rings may be alternatively constructed with sealing surfaces which are conical, axially curved, completely cylindrical or which possess any other desired shape. The exact contour of these rings will be governed by the radial relationship of adjacent wheel rims, characteristics of the working fluid, temperatures to which the turbine is to be subjected, and other factors influenced by the proposed use of the turbine.

In connection with the relation of the claims to the disclosure, it may be noted that the radially inner and outer face portions of extensions 32 define axially extending shoulders on the ring 30. The radially inner and outer walls 23 and 25 of grooves 24 define axially extending shoulders on the turbine wheels. The faces or flanks of the wheels (specifically, of the wheel rims 22) including the bases 27 of grooves 24 define radially extending shoulders on the wheels. The outer edges or end faces of the ring 30 include radial surfaces which define radially extending shoulders on the ring.

The extensions on the rings (or ring members) entering the grooves in the wheels (or wheel members) provide connections (specifically, tongue and groove connections) between the ring members and wheel members.

It will be understood that the term "turbine," as used hereinbefore, is not intended as a limitation on the use of the invention and that the described sealing ring structure is adapted generally for use in compressors, turbines and similar machines where it is necessary to have a rotating blade assembly cooperate with other rotating or stationary members under conditions inducing ring expansion.

I claim:

1. A turbine rotor or the like subject to substantial thermal expansion in operation comprising, in combination, two adjacent coaxial rotatably mounted rotor wheel members having rims, rotor blades mounted on the rims of the wheel members, the wheel members including the rims thereof having mutually confronting faces spaced from each other, a rotor sealing ring member disposed entirely between the said wheel members at the rims of the wheel members, and oppositely directed connections between the ring member and each of the said wheel members, each said connection comprising an annular extension on one said member and an annular groove in the other said member receiving the extension, the extension entering the groove in the direction axially of the wheels; the edges of the ring member and the faces of the wheel members defining radially extending shoulders at the said connections, said radially extending shoulders being axially spaced with sufficient clearance to accommodate axial expansion of the wheel and ring members in operation; and the axially extending walls of the grooves being spaced apart by a radial distance greater than the radial thickness of the extensions to accommodate differential radial expansion of the wheel members and ring members in operation, said radial distance being such that the extensions seat against one axially extending wall of the grooves in operation and against the other axially extending wall when the rotor is cold.

2. A turbine rotor or the like subject to substantial thermal expansion in operation comprising, in combination, two adjacent coaxial rotatably mounted rotor wheel members having rims, rotor blades mounted on the rims of the wheel members, the wheel members including the rims thereof having mutually confronting faces spaced from each other, a rotor sealing ring member disposed entirely between the said wheel members at the rims of the wheel members, and oppositely directed connections between the ring member and each of the said wheel members, each said connection comprising an annular extension on one said member and an annular groove in the other said member receiving the extension, the extension entering the groove in the direction axially of the wheels; the axially extending walls of the grooves being spaced apart by a radial distance greater than the radial thickness of the extensions to accommodate differential radial expansion of the wheel members and ring members in operation, said radial distance being such that the extensions seat against one axially extending wall of the grooves in operation and against the other axially extending wall when the rotor is cold.

References Cited in the file of this patent

UNITED STATES PATENTS

| | | |
|---|---|---|
| 1,680,737 | Hodgkinson | Aug. 14, 1928 |
| 2,241,782 | Jendrassik | May 13, 1941 |
| 2,427,244 | Warner | Sept. 9, 1947 |
| 2,452,782 | McLeod et al. | Nov. 2, 1948 |
| 2,488,867 | Judson | Nov. 22, 1949 |
| 2,497,151 | Clark et al. | Feb. 14, 1950 |
| 2,547,934 | Gill | Apr. 10, 1951 |
| 2,628,067 | Lombard | Feb. 10, 1953 |

FOREIGN PATENTS

| | | |
|---|---|---|
| 543,985 | Great Britain | Mar. 23, 1942 |
| 595,643 | Great Britain | Dec. 11, 1947 |
| 612,097 | Great Britain | Nov. 8, 1948 |
| 978,608 | France | Nov. 29, 1950 |